United States Patent [19]

Cochrane

[11] Patent Number: 4,915,359

[45] Date of Patent: Apr. 10, 1990

[54] SECURITY APPARATUS

[75] Inventor: Richard B. Cochrane, Steeledale, South Africa

[73] Assignee: Cochrane Steel Products (proprietary) Limited, Johannesburg, South Africa

[21] Appl. No.: 326,796

[22] Filed: Mar. 21, 1989

[30] Foreign Application Priority Data

Mar. 22, 1988 [ZA] South Africa ........................ 88/2017

[51] Int. Cl.[4] ................................................ A01K 3/00

[52] U.S. Cl. ........................................... 256/10; 256/8; 340/541

[58] Field of Search ............................ 256/10, 2, 7, 8; 340/541

[56] References Cited

U.S. PATENT DOCUMENTS

| | | | |
|---|---|---|---|
| 4,525,701 | 6/1985 | Leih | 256/10 X |
| 4,571,578 | 2/1986 | Karas | 340/541 X |
| 4,818,972 | 4/1989 | Mainiero | 340/541 X |

FOREIGN PATENT DOCUMENTS

| | | |
|---|---|---|
| 2114180A | 8/1983 | United Kingdom . |
| 2162879A | 2/1986 | United Kingdom . |
| 2175028A | 11/1986 | United Kingdom . |

*Primary Examiner*—Andrew V. Kundrat
*Attorney, Agent, or Firm*—Wenderoth, Lind & Ponack

[57] ABSTRACT

Security apparatus which has an outer concertina coil of barbed tape with an inner coiled electrical conductor, which may also be made from a concertina coil of barbed tape, positioned within the outer concertina coil and supported therefrom by means of insulators which prevent the conductor from coming in to electrical contact with the outer concertina coil.

13 Claims, 1 Drawing Sheet

SECURITY APPARATUS

BACKGROUND OF THE INVENTION

This invention relates generally to a security barrier and more particularly is concerned with a barrier which may be electrified.

The applicant is aware of a variety of security barriers which provide a mechanical deterrent, as opposed to an electrical deterrent. Examples of the aforementioned category of barriers, or techniques which may be incorporated in such barriers, are shown, inter alia, in the specifications of the following patents:

GB: Nos. 2114180, 921337, 541916, 887643, 978255 and 2023513

U.S. Pat. Nos.: 3,902,612, 3,263,830, 4,099,617, 4.367,059, 3,070,946, 2,908,484, 4,484,729, 3155,374, 3,972,510 and 4,119,301

German: No. 1215029

Austrian: No. 63424

Many of these barriers have been designed for rapid erection, and subsequent recovery, and so lend themselves to being mounted on a vehicle or trailer for transport to a place of use, and easy deployment.

Certain barriers make use of concerting type coils of barbed tape, barbed wire, or other flexible and resilient material which has a deterrent value and which can be compressed for storage, and then extended when required. The coils may be interlaced or interconnected to make the barrier more formidable.

Reference is made, for example, to U.S. Pat. Nos. 3,155,374, 4,484,729, and to the current applicant's, American patent U.S. Pat. No. 4,744,708.

Electrified barriers on the other hand, are not as easily erected for the electrical conductors used therein must be mounted on insulating supports which, in turn, to the applicants' knowledge, are fixed to, or anchored in, the ground. A second factor to be taken into account is that it is customary to erect a fence or other barrier, spaced from the electrified conductors, so that accidental contact with the conductors is unlikely.

SUMMARY OF THE INVENTION

The invention is concerned with security apparatus in the form of a barrier, which makes possible the rapid deployment of a system which can be electrified, and which can easily be recovered, when required.

The invention provides security apparatus which includes a tubular barrier coil, at least one electrical conductor which is located inside, and which extends in the axial direction of, the barrier coil, and insulating means which supports the electrical conductor from the barrier coil.

The barrier coil may comprise a plurality of coils of elongate material in end-to-end relationship. The coils may be secured in any suitable manner to one another. Preferably adjacent windings of the coils are tied together at strategic locations. Use may be made of clips, ties or any other suitable means for this purpose.

The elongate material may comprise any suitable material and may for example be plain wire or the like. However it is preferred, in order to enhance the deterrent and security effect of the apparatus, that the barrier coil is made from barbed tape, barbed wire or a similar material.

The barrier coil preferably comprises substantially helical windings of barbed tape around an axis. The windings may be spaced from one another along the length of the axis and may be movable towards, or away from, one another along the length of the axis. Adjacent windings may be fixed together for example by using clips.

It falls within the scope of the invention to make use of a plurality of electrical conductors, within the barrier coil although, for most applications, one electrical conductor is adequate. The electrical conductor may extend axially inside the helical windings of barbed tape.

The electrical conductor is preferably axially extensible or retractable together with the tubular barrier coil.

The electrical conductor may include a plurality of spiral sections with linear portions interconnecting adjacent spiral sections. In this way the electrical conductor may be extensible or retractible together with the barrier coil. The electrical conductor may alternatively be formed as a continuous helix or spiral by winding the conductor in tubular fashion about an elongate axis.

It is highly desirable that the electrical conductor is made from suitable material which permits the electrical conductor to be extensible or retractable in conjunction with the tubular barrier coil.

In one form of the invention the electrical conductor is made from barrier material for example barbed tape, barbed wire or the like. In a preferred embodiment the electrical conductor is made substantially in the same way as the tubular barrier coil.

As has been pointed out the electrical conductor is preferably made from a tensile material which has a resilient characteristic which enables the effective length of the conductor within the barrier to be altered in unison with variations in the length of the barrier coil and which at the same time prevents unwanted sagging of the electrical conductor relatively to the outer surrounding barrier coil.

The insulating support means may comprise a plurality of support devices fixed at regular intervals to the electrical conductor. Preferably the support devices extend between the electrical conductor which is positioned within the barrier coil, and windings of the barrier coil around the electrical conductor. Each support device may be fixed in any suitable way, tying, welding or the like to a respective point on the electrical conductor and to a respective point on the barrier coil.

The support devices may, themselves, be resiliently extensible and retractible. This ensures that the electrical conductor is at all times adequately supported, bearing in mind that the diameter of the barrier coil varies as its axial length is altered.

The invention also extends to security apparatus which includes an elongate tubular arrangement of coiled material, at least one electrical conductor extending axially within the tubular arrangement, and insulating means which supports the electrical conductor within the tubular arrangement out of contact with the coiled material.

According to a different form of the invention there is provided security apparatus which includes a tubular arrangement of coiled material which is axially extensible and retractible, an electrical conductor inside the tubular arrangement, and insulating means which supports the electrical conductor out of electrical contact with the coiled material and which permits the electrical conductor to extend and retract together with, and in the axial direction of, the tubular arrangement.

The invention also provides a concertina coil of barbed tape and a plurality of insulating devices which are attached to windings of the barbed tape coils at locations spaced from one another in the axial direction of the concertina coil.

BRIEF DESCRIPTION OF THE DRAWINGS

The invention is further described by way of examples with reference to the accompanying drawings in which.

DESCRIPTION OF PREFERRED EMBODIMENTS

Figure 1:
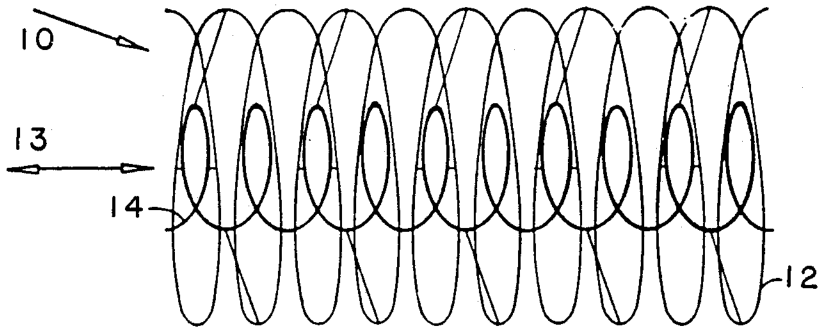
FIG. 1 is a schematic side elevation of security apparatus according to one form of the invention.
Figure 2:
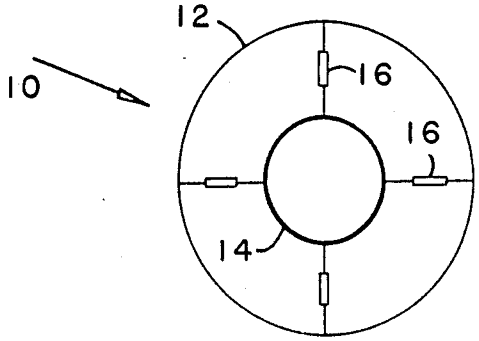
FIG. 2 is a cross sectional view, taken transversely to the illustration of FIG. 1, illustrating the cross sectional construction of the apparatus of FIG. 1.
Figure 3:
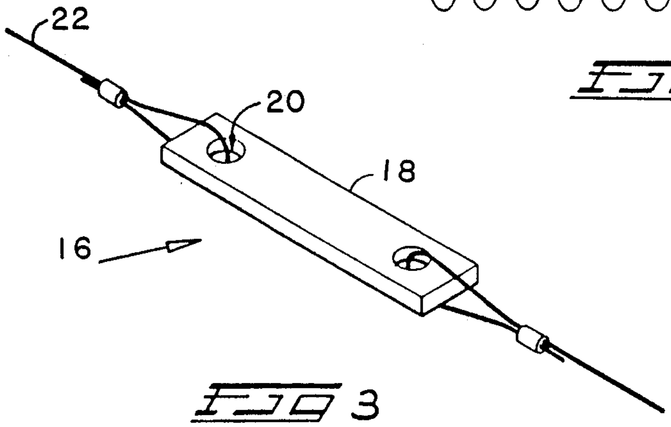
FIG. 3 is an enlarged view in perspective of portion of an insulating support means used in the apparatus of FIG. 1.

FIGS. 1 to 3 illustrate the construction of security apparatus 10 according to one form of the invention.

The apparatus 10 includes an outer coil 12 of helical barbed tape concertina wire. The outer barrier is made in a conventional way by winding barbed tape, which has a resilient inner core, to a helical form and then by securing adjacent windings of the helix to one another at strategic locations. The ties have not been shown for the sake of clarity of illustration. Any other suitable material could be used for the outer coil.

The outer barrier coil 12 is axially extensible or retractible, as is indicated by means of a double-headed arrow 13, and is at all times held in a desired configuration by the ties between adjacent windings. The construction of this type of coil does not, itself, form part of the invention. This type of coil is known in the art and so is not described herein in detail.

An electrical conductor wire 14, which in this example is wound in helical fashion, is positioned inside the outer barrier coil 12, extending in the axial direction of the coil. The conductor wire is preferably made from a resilient or tensile material eg. tensile steel wire so that, like the outer coil, it has an inherent stiffness and resilience or springiness.

As shown in FIGS. 1 and 2 the electrical conductor 14 is secured to the outer barrier coil 12 by means of a plurality of supporting devices 16 which are fixed to windings of the outer barrier coil 10, and to windings of the inner conductor wire 14, at regular intervals.

FIG. 3 illustrates a portion of one of the support devices 16 in enlarged detail and in perspective. The device 16 includes a primary insulating strip 18 which is made from a suitable plastics material such as PVC which has been hardened with an ultra violet inhibitor. Holes 20 formed at opposing ends of the strip 18 have insulating ties 22 fixed to them. These ties are in turn respectively fixed to opposing sections of the outer barrier coil 12 and the inner conductor wire 14, at regular intervals. The net result is that the inner conductor wire 14 is stably supported inside the outer barrier coil.

The coil 12 and the conductor wire 14 each have a helical-type construction and consequently, by appropriately dimensioning the two coils and through the correct choice of the number of windings per unit length in each coil, the two coils are extensible, and retractible, in unison. The coil 12 and the conductor wire 14 each have an inherent stiffness and resilience which prevents any significant degree of unwanted sagging and this prevents the conductor wire between adjacent support devices 16 from coming into electrical contact with the outer barrier coil 12.

The security apparatus of the invention, as shown in FIGS. 1 and 2, is manufactured so that it has a predetermined length when fully extended. For transport and storage purposes the security apparatus can of course be compressed, using any suitable technique, in the axial direction. The coils 12 and 14 are then extended, according to need, on site.

A plurality of the assemblies shown in FIGS. 1 and 2 are used at a security site. The outer barrier coils of adjacent assemblies, located end-to-end, are mechanically tied to one another for example using clips, ties or the like. The inner conductor wires 14 are crimped to one another using copper ferrules or similar conducting fasteners. Thereafter the inner conductor wire 14, which now is continuous along a length or perimeter which is to be guarded, is electrified using conventional equipment, which is not described herein for it plays no meaningful role in understanding the physical construction of the security assembly.

The arrangement described thus far has a number of significant advantages. In the first instance the outer barrier coil can be made to practically any required size and the inner connector wire, coiled as described, can then be made to fit. The conductor wire is suspended from the spirals of the coiled barbed tape and consequently follows the route of the outer barrier coil when installed. The need for separate or independent insulators, for supporting the inner conductor wire 14 in a conventional way, is therefore eliminated. As the outer barrier coil 12 has a significant degree of flexibility it is able to follow the gradient of the ground on which it is placed and traverse bends or change direction with ease. The inner conductor wire 14 automatically follows the direction of the outer barrier coil at all times. There is no need thus for independently aligning the conductor wire relatively to the outer barrier coil for this function is achieved automatically by means of the plurality of support devices 16. The likelihood that the conductor wire 14 can touch the barrier coil 12 accidentally, for example due to wind movement, is largely obviated.

Use can be made of conventional apparatus, for example of the kind described in the applicant's U.S. Pat. No. 4,744,708, for the rapid deployment and easy recovery of the barrier but, clearly, although the barrier is most useful for this type of application it can also be used for more permanent installations.

Through the use of conventional electronic security equipment it is possible to detect any attempted breach of the barrier and fairly accurately pinpoint the location of the attempted breach. In addition an electric current can be transmitted to a breach point, generating an electric shock, which repels and intruder.

The ability of the conductor wire 14 to extend or retract in unison with the barrier coil 12 is achieved principally by virtue of the fact that the conductor wire 14 is made from a resilient material which is coiled e.g. by being wound in helical form to a shape which possesses similar properties to the outer coil 12. A similar effect may however be achieved in the way shown in FIG. 4 which schematically shows an inner conductor wire 14A formed from tensile wire which is wound with a plurality of spiral or spring formations 24 which are separated by means of linear portions 26. The spiral formations 24 permit axial variations in the length of the inner conductor, in unison with changes in the length of the outer barrier coil, much in the manner already described.

Figure 4:
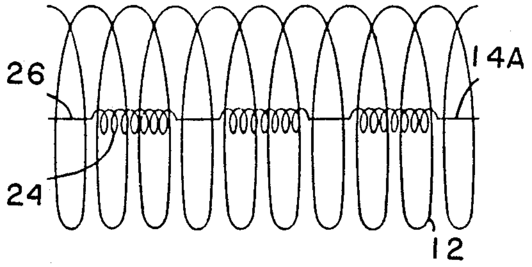
FIG. 4 is a schematic side elevation, similar to FIG. 1, of a second embodiment of the invention.

It is to be noted that FIGS. 1 and 4 illustrate embodiments of the invention which make possible the rapid and temporary deployment of the barrier of the invention. On the other hand if the barrier is installed at a site which permits the barrier to be adjusted, and barrier movement thereafter is minimal, e.g. at a permanent or semi-permanent site, then the electrical conductor could be a non-coiled length of wire.

The security barrier of the invention has the important advantage that the barrier coil 12 provides a significant and visual deterrent effect. It is therefore extremely unlikely that an innocent party would penetrate the barrier coil sufficiently to touch the conductor wire 14, and so be shocked. It therefore becomes more likely that persons who are shocked are, in fact, intruders.

At little extra cost the conductor wire 14 may itself comprise a concertina helical coil of barbed tape or the like. Thus an inner physical barrier is provided which has a similar deterrent effect to the outer barrier coil. The inner coil will obviously, in addition, be electrified and so possess electric deterrent qualities.

The invention has been described with reference to a particular form of construction. Obviously the invention can be implemented in other ways, resulting in different appearances to the illustrated embodiments. The essence of the invention lies in the provision of an electrical conductor inside a coil which has physical deterrent properties in such a way that the electrical conductor is at all times safely supported inside the outer coil and is prevented from inadvertently coming into contact with the outer barrier coil. The electrical conductor is in addition capable of moving axially in unison with the outer barrier coil, whether for extension or retraction of the entire assembly.

As the length of the outer barrier coil is varied, by extension or retraction in the axial sense, the effective diameter of the helical coils also changes, reducing with axial extension and increasing with axial retraction.

To prevent the conductor wire 14 from being unnecessarily stressed, or from sagging, as a result of the barrier coil's diameter changing, the support devices 16 may, themselves, be axially variable in length and, for this purpose, the ties 22 may for example be formed as spirals from a resilient material i.e. the ties could be helical springs. The devices 16 thus change in length, as the barrier coil.

I claim:

1. Security apparatus which includes a barrier coil having a plurality of side-by-side turns defining a tubular space extending along the coil within the turns, at least one electrically uninsulated electrical conductor which is located inside said tubular space, and which extends in the axial direction of, the barrier coil, and electrical insulating means connected between the electrical conductor and the coil and supporting the conductor within the tubular space of the barrier coil.

2. Security apparatus according to claim 1 wherein the barrier coil is made from barbed tape, barbed wire, or a similar material.

3. Security apparatus according to claim 1 wherein the barrier coil includes substantially helical windings around an axis and along the length of the axis, the windings being movable towards, or away from, one another along the length of the axis.

4. Security apparatus according to claim 1 wherein the electrical conductor is extensible and retractible in the axial direction of the barrier coil.

5. Security apparatus according to claim 1 wherein the electrical conductor includes a plurality of spiral sections with linear portions interconnecting adjacent spiral sections.

6. Security apparatus according to claim 1 wherein the electrical conductor is a continuous spiral or helix.

7. Security apparatus according to claim 1 wherein the electrical conductor is made from barbed tape, barbed wire or a similar material.

8. Security apparatus according to claim 1 wherein the insulating support means includes a plurality of insulating support devices each of which is fixed to a respective point on the electrical conductor and to a respective point on the barrier coil.

9. Security apparatus according to claim 8 wherein each support device is resiliently extensible and retractible.

10. Security apparatus according to claim 8 wherein each support device includes two flexible ties joined together by means of an insulator.

11. Security apparatus which includes a flexible, axially extensible and retractable, elongate barrier of substantially tubular shape defining a tubular space therewithin, a flexible, axially extensible and retractible, uninsulated electrical conductor of substantially tubular shape extending axially within the tubular space within said elongate barrier, and insulating means connected between the electrical conductor and the tubular elongate barrier and supporting said electrical conductor within said tubular elongate barrier and out of contact therewith.

12. Security apparatus which includes coiled material defining a tubular space extending along and within the coiled material, said coiled material being axially extensible and retractible, a coiled uninsulated electrical conductor inside the tubular space and extending therealong, and insulating means connected between said electrical conductor and said coiled material and supporting the electrical conductor out of contact with the coiled material and which permits the electrical conductor to extend and retrract together with, and in the axial direction of, said coiled material.

13. A conductor and support means for positioning inside a coiled barrier material, comprising;

a concertina coil of barbed tape, and a plurality of insulating devices attached to the individual turns of said barbed tape at locations spaced from one another in the axial direction of said coil and extending outwardly from said coil for attachment to the coiled barrier material for supporting the conductor and support means within the space inside the coiled barrier material.

* * * * *